Jan. 4, 1972   W. A. McALLISTER   3,632,522
CALCIUM GALLATE COMPOSITION ACTIVATED BY MANGANESE
AND METHOD OF PREPARATION
Filed Sept. 5, 1969
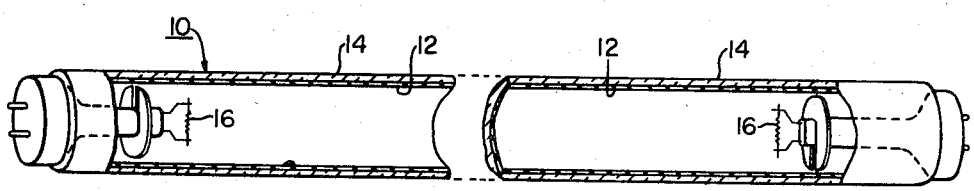
WITNESSES
Theodore F. Wrobel
James F. Young
INVENTOR
William A. McAllister
BY Walter Sutcliff
ATTORNEY 3,632,522
CALCIUM GALLATE COMPOSITION ACTIVATED BY MANGANESE AND METHOD OF PREPARATION
William A. McAllister, Convent Station, N.J., assignor to Westinghouse Electric Corporation, Pittsburgh, Pa.
Filed Sept. 5, 1969, Ser. No. 855,490
Int. Cl. C09k 1/04, 1/68
U.S. Cl. 252—301.4 R
5 Claims

ABSTRACT OF THE DISCLOSURE

An improved luminescent composition of manganese activated calcium gallate, wherein up to about 25 atom percent of the gallium can be substituted for by aluminum. The composition is prepared by an improved method of preparation which comprises firing the raw mix constituents with at least one of the fluxes of the group consisting of cadmium bromide, cadmium chloride, sodium chloride, ammonium chloride, and aluminum sulfate. The prepared composition exhibits improved luminescent intensity, and maintenance of luminescent intensity.

BACKGROUND OF THE INVENTION

The composition calcium gallate activated by manganese is described in U.S. Pat. 3,407,139; however, the fluorescent intensity under ultraviolet excitation of this composition following the preparation as indicated in the aforementioned patent is not as good as desired.

The orange emitting manganese activated calcium gallate composition exhibits an interesting spectral energy distribution, quite like that of the long wavelength band in cool white halophosphate; this suggests its use in various blend combinations.

Very high output fluorescent lamps which operate at a relatively higher operating current and bulb wall temperature are now well known in the art. The standard halophosphate phosphor utilized in such very high output fluorescent lamps has a poor temperature lumen-output characteristic and at the operating bulb temperature of such lamps the lumen output of the halophosphate phosphors typically used can be twenty percent below that observed in room temperature operation.

The calcium gallate composition is relatively expensive because of the high gallium content and its cost.

SUMMARY OF THE INVENTION

It is an object of the invention to improve the luminescent intensity of the manganese activated calcium gallate composition on ultraviolet excitation.

It is a further object to improve the temperature dependence of lumen output for this composition.

It is yet another object to reduce the cost of the calcium gallate composition.

It is a further object of the invention to utilize the improved composition having a favorable temperature dependence in a very high output flourescent lamp combination.

It has been discovered that calcium digallate phosphor activated by manganese can be improved by preparing it with the addition of predetermined amounts of at least one of the group consisting of cadmium bromide, cadmium chloride, sodium chloride, ammonium chloride, or aluminum sulfate and calcining the resulting mixture to activate the composition. It has also been discovered that up to about 25 atom percent of the gallium in this composition $CaGa_4O_7:Mn_x$ can be replaced by aluminum. In the preferred manganese activating proportion, "X" is about 0.001 to 0.1.

BRIEF DESCRIPTION OF THE DRAWING

The sole figure is an elevational view partly in section of a very high output fluorescent lamp.

DESCRIPTION OF THE PREFERRED EMBODIMENT

In preparing the improved gallate composition, a raw mix of finely divided materials typically contains 1 mol of calcium oxide, 2 mol of gallium oxide, and about 0.01 mol of a manganese containing compound which is readily reducible to the oxide, typically manganese carbonate. At least one of the fluxes of the group consisting of cadmium bromide, cadmium chloride, sodium chloride, ammonium chloride, and aluminum sulfate is then added to the phosphoric constituents in the raw mix. The greatest increase in fluorescent intensity is had by including in the raw mix cadmium bromide, in an amount of about 10 weight percent of the total raw mix.

The resulting mixture is fired at a temperature of about 1200° C. for about one hour to provide the improved gallium composition. The firing is preferably carried out in nitrogen or other such inert atmosphere. The firing temperature and time are not critical, and the firing is preferably carried out at from 1100–1300° C. for at least one hour with the lower the temperature the longer the time. A refiring at about 1200° C. for about one hour has also been found advantageous. Any one of the other fluxes of the group recited above can be substituted for the cadmium bromide in preparing the composition, with the fluxes being added in amounts of from about 1 to about 20 weight percent of phosphor constituents included in raw mix.

It has further been found that considerable cost saving can be effected by substituting aluminum for a portion of the gallium in the composition. Thus aluminum oxide can be substituted in the raw mix for a portion of the gallium oxide to supply aluminum and to replace from about 1 to 25 atom percent of the gallium included in the raw mix. The preferred gram atom ratio of aluminum to gallium in the final composition is about 0.2 to maximize lumen output, but to minimize cost the aluminum can be added within the defined range.

It has been discovered that the composition of the present invention exhibits a very good lumen output under increased temperatures as well as a general increase in fluorescent intensity upon ultraviolet excitation. The typical maintenance for such phosphors is about 97% during a 500 hour operating period. The lumen output of this improved, flux-fired gallate composition is substantially uniform to about 160° C., and at temperatures of 220 to 273° C. it is substantially better than halophosphate phosphor which is typically used in highly loaded lamps at similar temperatures. This high lumen output at high operating temperatures suggests an application for the manganese-activated gallate of the present invention when a blend of the gallate and blue halophosphate phosphor is used in a very high output fluorescent lamp combination to give white light. The blend of phosphors which is coated in standard density on the interior of the fluorescent lamp to give cool white color would comprise about 58% by weight of the gallate composition given in the preferred embodiment and about 42% by weight of the blue calcium halophosphate phosphor

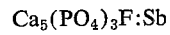

a well known phosphor, activated by antimony typically in a range of from 0.01 to 0.02 gram-atom of Sb per gram atom of P. Of course, the weight percentages of the phosphors in the blend can be readily shifted to shift the color of the light output.

The very high output fluorescent lamp 10 shown in the sole figure is a standard highly loaded lamp with the blended phosphors 12 being coated on the interior of the bulb wall 14. The lamp 10 of course, has operatively disposed electrodes 16 at either end of the lamp, and the lamp is filled with a predetermined amount of mercury and inert fill gas. For highly loaded lamps, either heat shields behind the electrodes or an indium-mercury amalgam are use to control the mercury partial pressure during operation. Such a highly loaded lamp is more completely described in U.S. Pat. 3,252,028, issued May 17, 1966, and the general teachings of such lamp construction are incorporated by reference to further explain the operation of such a lamp.

I claim as my invention:

1. A method of preparing the luminescent composition calcium digallate activated by manganese, which method comprises, preparing a raw mix containing predetermined proportions of calcium, gallium, oxygen, and activating proportions of manganese, which satisfy the manganese-activated calcium digallate formulation, and adding thereto a predetermined amount of at least one flux of the group consisting of cadmium bromide, cadmium chloride, sodium chloride, ammonium chloride, and aluminum sulfate, and firing the resulting mixture to prepare said composition.

2. The method as specified in claim 1, wherein said flux is added in an amount of from about 1 to 20 weight percent of the digallate constituents.

3. The method as specified in claim 1, wherein said flux is cadmium bromide added in an amount of about 10 weight percent of the digallate constituents.

4. The method as specified in claim 1, wherein up to about 25 atom percent of the gallium is replaced by aluminum.

5. The method as specified in claim 1, wherein manganese is present in said raw mix in such amount as to provide in said composition from about 0.001 to 0.1 gram-atom of manganese per gram-mol of calcium digallate.

References Cited
UNITED STATES PATENTS 3,407,139　10/1968　Brown, Jr. _____ 252—301.4
3,499,843　 3/1970　Brown, Jr. et al. ____ 252—301.4

ROBERT D. EDMONDS, Primary Examiner